US012520153B2

United States Patent
ElDokany et al.

(10) Patent No.: US 12,520,153 B2
(45) Date of Patent: Jan. 6, 2026

(54) XApp SELF-CONFLICT MANAGEMENT

(71) Applicant: Dell Products, L.P., Round Rock, TX (US)

(72) Inventors: Yasmin ElDokany, Fifth Settlement (EG); Mohamed Abouzeid, El Sheikh Zayed (EG); Rana Afifi, New Cairo (EG)

(73) Assignee: DELL PRODUCTS L.P., Round Rock, TX (US)

( * ) Notice: Subject to any disclaimer, the term of this patent is extended or adjusted under 35 U.S.C. 154(b) by 156 days.

(21) Appl. No.: 18/480,000

(22) Filed: Oct. 3, 2023

(65) Prior Publication Data
US 2025/0113192 A1    Apr. 3, 2025

(51) Int. Cl.
*H04L 29/06*    (2006.01)
*H04W 12/12*    (2021.01)

(52) U.S. Cl.
CPC ................... *H04W 12/12* (2013.01)

(58) Field of Classification Search
CPC ..................................... H04W 12/12
See application file for complete search history.

(56) References Cited

U.S. PATENT DOCUMENTS

| | | | |
|---|---|---|---|
| 2022/0014963 A1* | 1/2022 | Yeh | G06N 3/045 |
| 2023/0069604 A1* | 3/2023 | Subramani Jayavelu | |
| | | | G06F 9/547 |
| 2024/0259879 A1* | 8/2024 | Ranganath | H04L 41/5054 |

FOREIGN PATENT DOCUMENTS

WO    2023/091664 A1    5/2023

OTHER PUBLICATIONS

International Search Report and Written Opinion received for PCT Application Serial No. PCT/US2024/013885 dated Apr. 10, 2024, 17 pages.
Polese et al., "Understanding O-RAN: Architecture, Interfaces, Algorithms, Security, and Research Challenges", IEEE, Communications Surveys & Tutorials, vol. 25, No. 2, Second Quarter, 2023, pp. 1376-1411.
Polese et al., "Colo-RAN: Developing Machine Learning-based xApps for Open RAN Closed-loop Control on Programmable Experimental Platforms", IEEE, Dec. 17, 2021, 13 pages.

* cited by examiner

*Primary Examiner* — Wasika Nipa
(74) *Attorney, Agent, or Firm* — Amin, Turocy & Watson, LLP

(57) ABSTRACT

Architectures and techniques are described that can provide detection and mitigation techniques for self-conflicting behavior associated with an xApp that is executed on a near-real time radio access network intelligent controller (near-RT RIC). A first set of inputs relating to xApp data (e.g., data consumed by the xApp, parameters controlled by the xApp, xApp description of purpose or function, . . . ) can be input to a first machine learning model to determine potential self-conflicting behavior. A second set of inputs relating to xApp control data (e.g., a current control action, previous control action history, . . . ) can be input to a second machine learning model to determine other types of potential self-conflicting behavior. If self-conflicting behavior is detected, then mitigation techniques can be invoked.

20 Claims, 14 Drawing Sheets

XApp SELF-CONFLICT MANAGEMENT

BACKGROUND

Open Radio Access Network (O-RAN) is a promising technology that enables network operators to easily integrate different components from different vendors by suggesting new open interfaces and architectures. O-RAN introduces the intelligence of a radio access network (RAN) through a Near-Realtime RAN Intelligent Controller (Near-RT RIC) and Non-Realtime RAN Intelligent Controller (Non-RT RIC) which can enable different vendors to deploy different xApps and rApps to improve network performance in different network slices. For example, an xApp that is deployed on a Near-RT RIC can be purposed to change network configuration elements (e.g., parameters of an E2 Node) based on network metrics data or other data.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
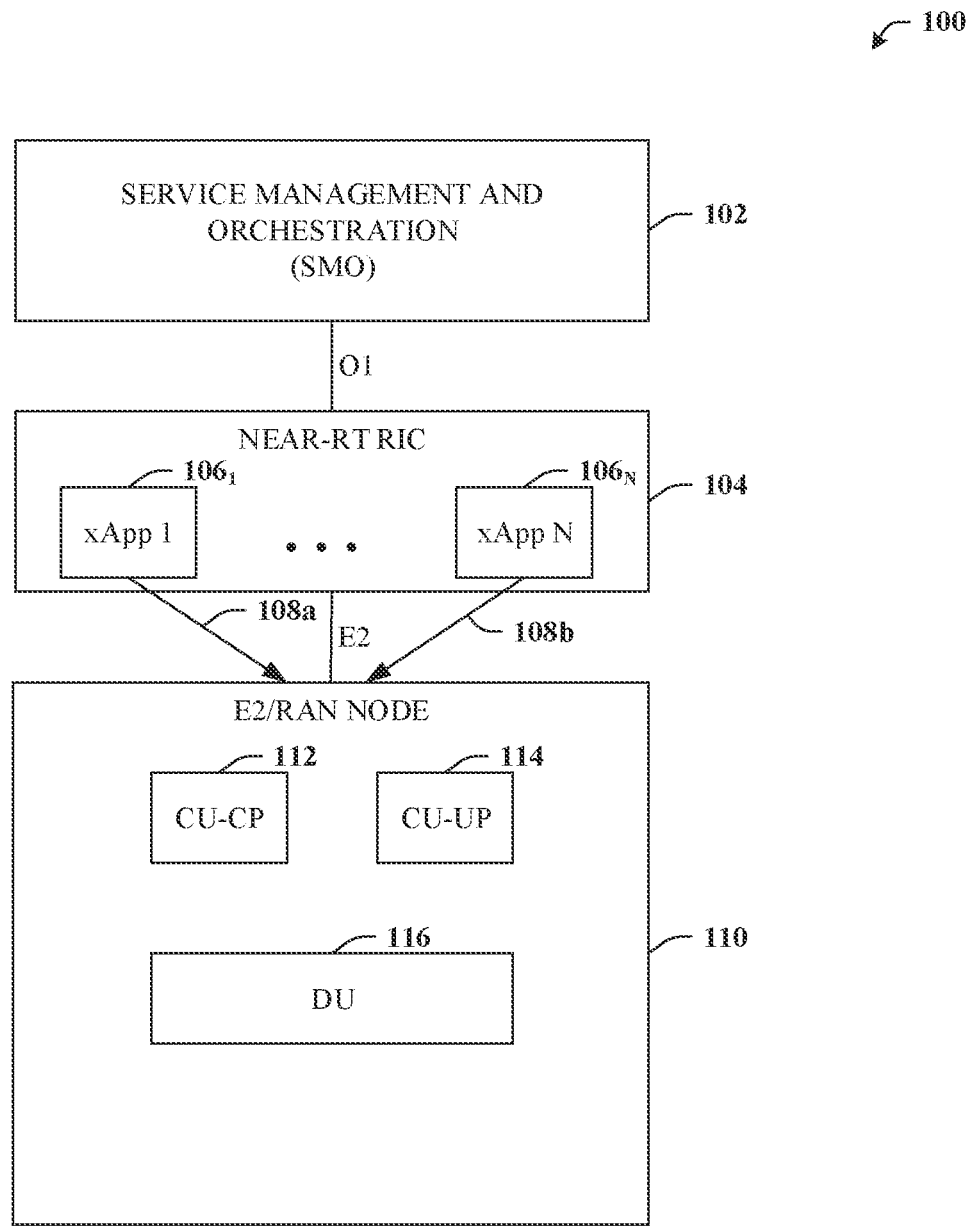
FIG. 1 depicts a schematic block diagram illustrating an example conflict between different xApps in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In an O-RAN deployment, the near-RT RIC can comprise many different extended applications (xApps), each of which can be executed to provide some specific objective such as optimizing a specific network metric. However, since these xApps can be from different network vendors and can support different network slices, the xApps can at times attempt to apply conflicting configurations to the RAN when performing independent optimization jobs, thus potentially leading to overall network performance degradation.

Hence, previous approaches to conflict mitigation are generally directed to addressing conflicting interactions between different xApps that execute on a near-RT RIC in accordance with the below example detailed in connection with FIG. 1.

FIG. 1 depicts a schematic block diagram 100 illustrating an example conflict between different xApps in accordance with certain embodiments of this disclosure. As illustrated, service management and orchestration (SMO) 102 can communicate with near-RT RIC 104 via an O1 interface. SMO 102 can operate as a management and orchestration layer that controls configuration and automation aspects of RIC and RAN elements.

Near-RT RIC 104 can comprise various xApps 106, illustrated here as xApps $106_1$-$106_N$, where N can be any whole number. Near-RT RIC 104 can communicate with radio access network (RAN) node and/or E2 node 110 via an E2 interface. In some embodiments, E2 node 110 can represent a RAN portion of the network architecture. Such can include one or more centralized unit (CU), including a centralized unit control plane (CU-CP) 112 and a centralized unit user plane (CU-UP) 114. E2 node 110 can further comprise one or more distributed unit (DU) 116, as understood in the art. Thus, workloads of the xApps 106 are executed by Near-RT RIC 104, typically using data collected from the RAN portion of the network (e.g., E2 node 110). In response, control messages 108 can be delivered to E2 node 110 based on the data collected in order to improve or otherwise reconfigure an element of E2 node 110.

A given control message can therefore represent an action 108 to take on E2 node 110, typically instructing E2 node 110 to modify some parameter or other configuration or setting. As indicated, a conflict can arise when an action 108a suggested by a first xApp $106_1$ conflicts with (e.g., degrades or interferes with) objectives of a configuration suggested for action 108b of a different xApp $106_N$. In that regard, there are several potential types of conflicts, such as direct conflicts, indirect conflicts, and implicit conflicts.

Direct conflicts can be observed directly. An example of a direct conflict can occur when two or more xApps 106 request different settings for the same configuration of one or more parameters of a target element (e.g., an element of E2 node 110). As another example of a direct conflict can occur when a new request from an xApp 106 conflicts with the running configuration resulting from a previous request by another (or even the same) xApp 106.

Indirect conflicts generally cannot be observed directly, but nevertheless some dependence among the parameters and resources that xApps 106 target can be observed. For instance, different xApps 106 can target different configuration parameters to optimize the same metric according to the respective xApp 106 objectives. Therefore, an indirect conflict can occur when changes requested by xApp $106_1$ create a system impact that is equivalent to a parameter change targeted by another xApp $106_N$.

Implicit conflict generally cannot be observed directly; even the dependence between xApps may not be obvious. For instance, different xApps 106 may optimize different metrics and (re-)configure different parameters. Nonetheless, optimizing one metric may have implicit, unwanted, and potentially adverse side effects on one of the metrics optimized by another xApp 106. For example, protecting throughput metrics for guaranteed bit rate (GBR) users may degrade non-GBR metrics, or even cell throughput, either of which may be managed by other xApps 106 via conflicting settings.

As noted, previous conflict mitigation approaches have been directed to addressing the challenges that one xApp may conflict with another xApp. For example, O-RAN specifications now propose approaches for the three different types of conflicts. However, in addition to the capacity for an xApp to conflict with other xApps, there is also the possibility that an xApp can conflict with itself, referred to herein as a self-conflict. Hence, while xApp conflicts between two or more xApps are recognized and have existing mitigation approaches, self-conflicts do not appear to be addressed in O-RAN specifications or in other literature.

An xApp self-conflict can occur when an xApp makes control action 108 requests to changes a parameter of E2 node 110 in a manner that is redundant or consecutively conflicts with previous control actions by that xApp. Such can negatively impact a RAN deployment's performance, the availability of resources and security, as well as the quality of service of connected users. Another type of self-conflict can occur when an xApp requests resources that are out of the scope of its intended purpose such as subscribing to data (e.g., inputs to the xApp) that is not within the scope of the xApp descriptions or controlling E2 node 110 parameters that are not within the scope of the xApp description. Hence, self-conflicts might also expose vulnerabilities related to improper collection of potentially sensitive data or improper control of E2 node 110 parameters.

The disclosed subject matter, in some embodiments, is directed to managing or mitigating xApp self-conflicts, which is further discussed with reference to FIG. 2. Such can significantly mitigate the exposure of many potential vulnerabilities, including performance or security issues, associated with inefficiently designed xApps or even xApps specifically designed to be malicious.

Example Systems

Figure 2:
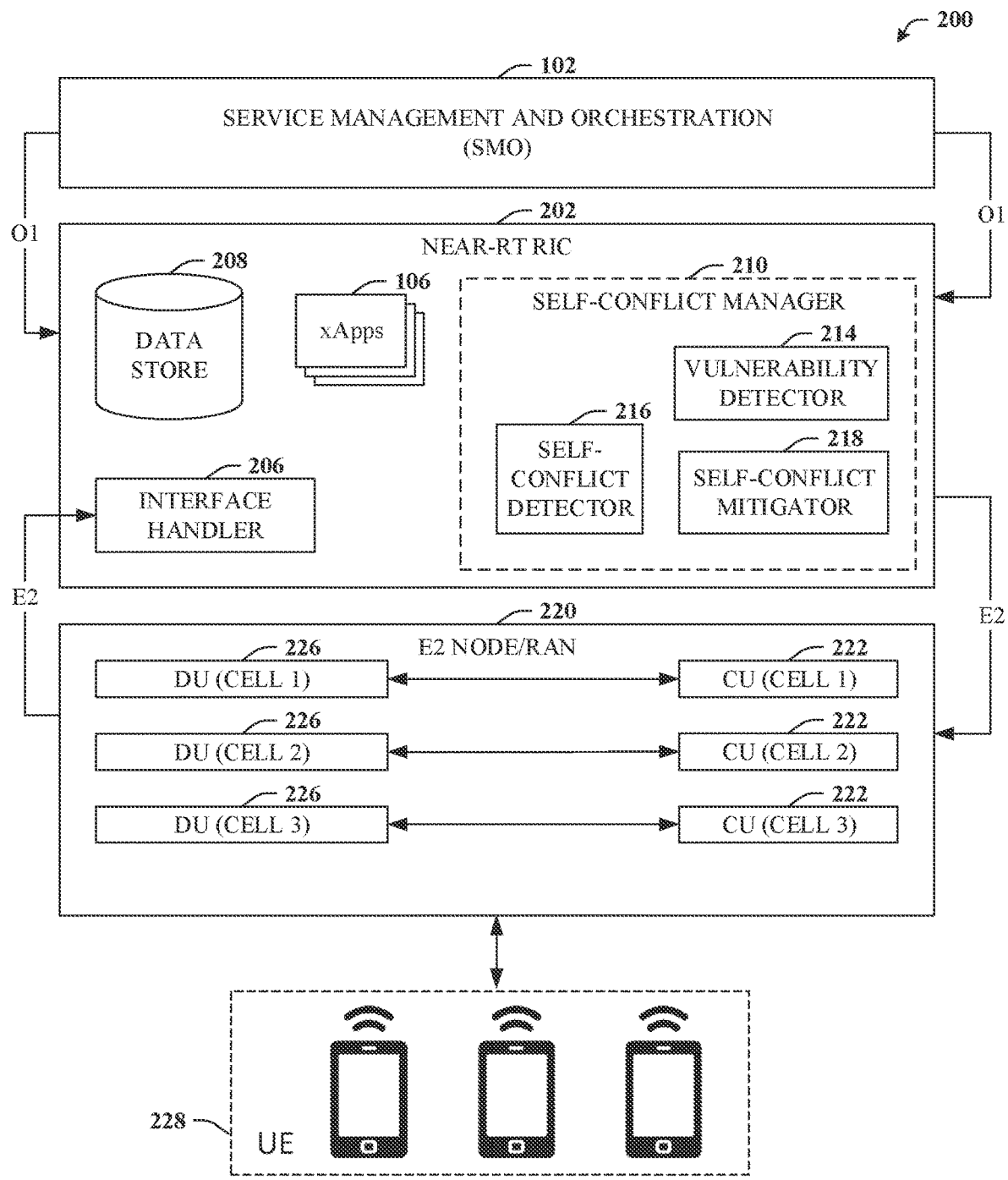
FIG. 2 depicts a schematic block diagram illustrating an example system that can utilize machine learning techniques to mitigate xApp self-conflicts for an xApp executing on a near-RT RIC in accordance with certain embodiments of this disclosure.

Referring now to FIG. 2, a schematic block diagram is depicted illustrating an example system 200 that can utilize machine learning techniques to mitigate xApp self-conflicts for an xApp executing on a near-RT RIC in accordance with certain embodiments of this disclosure. For example, near-RT RIC 202 can comprise xApps 106, as detailed in connection with near-RT RIC 104 of FIG. 1. Each xApp 106 can be programmed to apply one or more control actions (e.g., via control messages transmitted over an E2 interface) that affect one or more parameters of an E2 node 220.

For some further context, example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected.

As mentioned, E2 node 220 can represent elements of a RAN portion such as CU 222 or DU 226. As illustrated, elements of E2 node 220 can serve a group of user equipment (UE) 228. Service of UE 228 can be optimized or improved by operation of xApps 106.

In addition to xApps 106, near-RT RIC 202 can comprise interface handler 206. Interface handler 206 can allow a controller of the near-RT RIC 202 to receive data from all the cooperating cells. Near-RT RIC 202 can further comprise data store 208. Data store 208 can represent a local store for a given near-RT RIC 202. Typically, data store 208 can be configured to store key performance indicators (KPIs) and other network metrics as well as control actions that were executed or applied to E2 node 220 within a session or historically.

Near-RT RIC 202 can further comprise certain self-conflict manager 210. Self-conflict manager 210 can operate as a service that can manage machine learning (ML) models or pipelines to assess deployed xApps for self-conflicts. For the purposes of this example, functionality associated with self-conflict manager 210 is divided into through categories, each handled by a different element subcomponent, however, it is appreciated that other embodiments can exist to facilitate the disclosed techniques directed to managing or mitigation self-conflicts for an xApp. In that regard, self-conflict manager 210 can comprise vulnerability detector 214, self-conflict detectors 216, and self-conflict mitigator 218.

Vulnerability detector 214 can employ a machine learning model to predict a level or degree of vulnerability of xApp 106 based on the inputs or outputs of the xApp (e.g., KPIs or the like). Additional detail relating to vulnerability detector 214 is provided in connection with FIG. 3.

Self-conflict detector 216 can employ another machine learning model to detect whether xApps 106 control actions are self-conflicting. Additional detail relating to self-conflict detector 216 is provided in connection with FIG. 4.

Self-conflict mitigator 218 can determine a level of severity of the self-conflict that is caused by the xApp. In some embodiments, operation of self-conflict mitigator 218 can be according to a rules-based engine or template that can rely on the output of vulnerability detector 214 and/or self-conflict detector 216. In some embodiments, self-conflict mitigator can facilitate mitigation procedures or remedial actions to prevent xApp 106 from exposing vulnerabilities (e.g., degrading E2 node performance, exposing security issues, . . . ) such as alerting SMO 102 or other suitable targets, blocking control actions requested by xApp 106, and so on. Additional detail relating to self-conflict mitigator 218 is provided in connection with FIG. 5.

Figure 3:
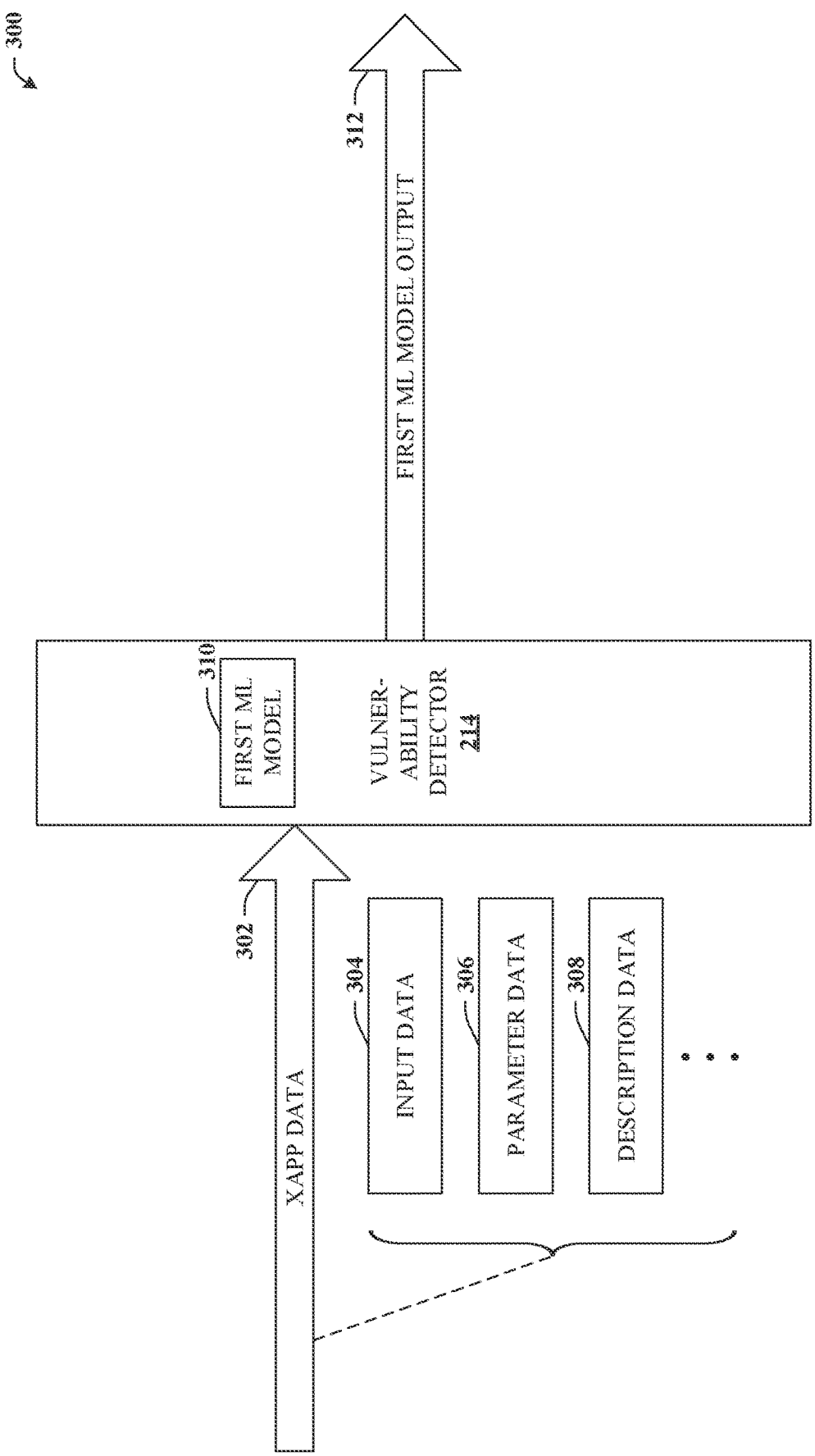
FIG. 3 depicts a schematic block diagram illustrating additional aspects or elements of the vulnerability detector that can rely on a first machine learning model in accordance with certain embodiments of this disclosure.

With reference now to FIG. 3, a schematic block diagram 300 is depicted illustrating additional aspects or elements of vulnerability detector 214 that can rely on a first machine learning model in accordance with certain embodiments of this disclosure. In some embodiments, vulnerability detector 214 can leverage first ML model 310. Thus, vulnerability detector 214 can consume as input xApp data 302. xApp data 302 can comprise various data including all or a portion of input data 304, parameter data 306, description data 308, and so forth.

Input data 304 can relate to the input(s) requested or subscribed to by xApp 106, such as KPIs or other suitable metrics or data. Parameter data 306 can relate to the outputs of xApp 106, such as the parameters (e.g., of an E2 node) that are indicated to be controlled xApp 106. Description data 308 can relate to the indicated topic, mission, category, or purpose of xApp 106 (e.g., "a cell-level control" xApp, "A SINR-optimizing" xApp, and so forth).

In response to xApp data 302 (e.g., input data 304, parameter data 306, description data 308, . . . ) vulnerability detector 214 and/or first ML model 310 can generate first ML model output 312, which can indicate a potential for xApp 106 to cause vulnerabilities in an associated network.

It is appreciated that xApp data 302 can generally be available when xApp 106 is registered to the near-RT RIC 202 and after associated subscription procedures. Thus, such information (e.g., xApp data 302) can be collected at registration time and stored to data store 208 for subsequent use in connection with self-conflict manager 210. In some embodiments, xApp data 302 can be input to vulnerability detector 214 at registration time and first ML model output can store to data store 208 for later recall by self-conflict manager 210.

Regardless, first ML model 310 can receive xApp data 302 and use said data to determine a pattern between input data 304 and parameter data 306 that may cause vulnerabilities and/or to detect that xApp 106 is acting maliciously or requesting information (e.g., input data 304) or attempting to control parameters of an E2 node (e.g., parameter data 306) that are outside the scope of legitimate operation of xApp 106, which can be a determination guided by description data 308.

Figure 4:
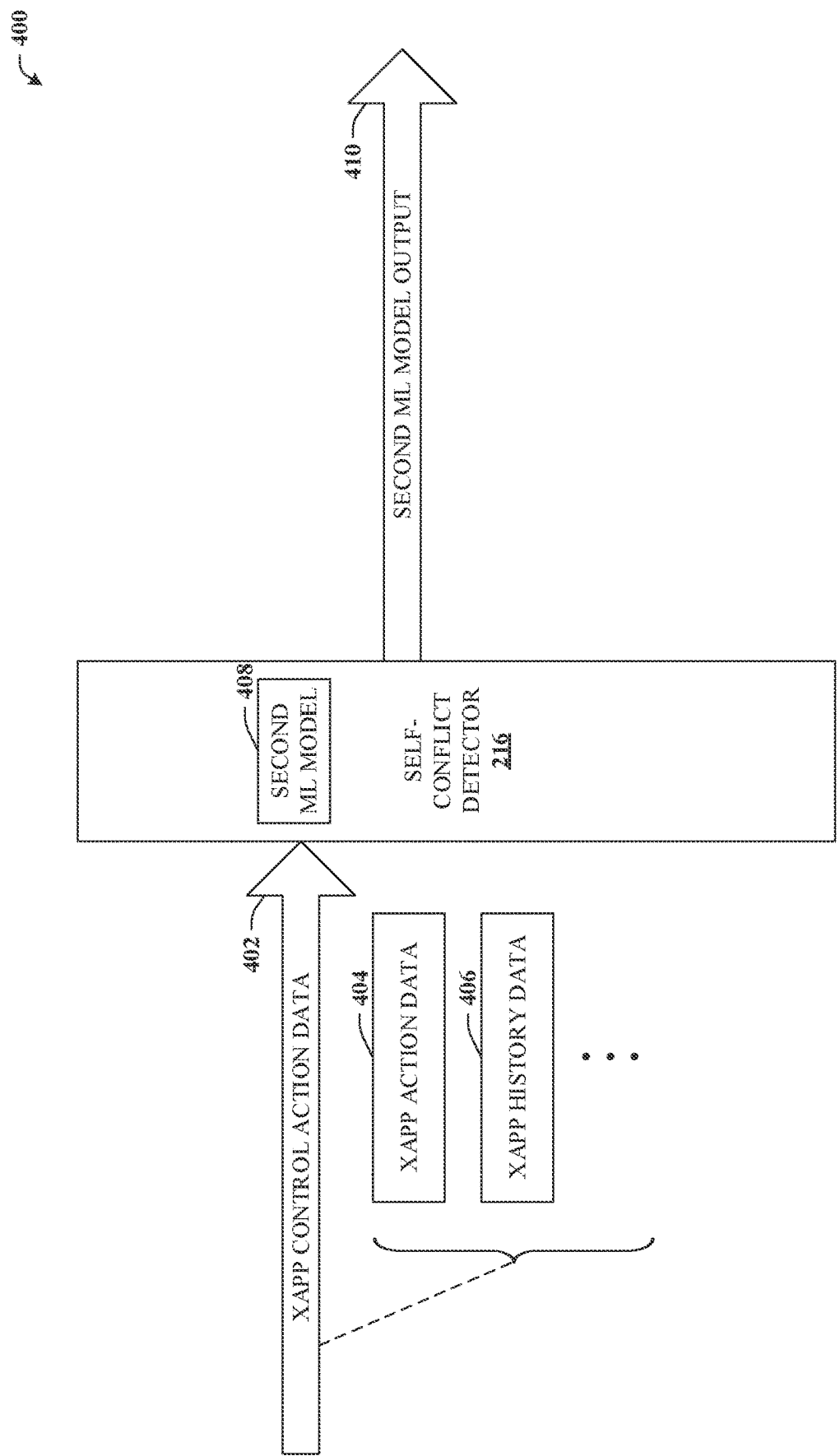
FIG. 4 illustrates a schematic block diagram illustrating additional aspects or elements of the self-conflict detector that can rely on a second machine learning model in accordance with certain embodiments of this disclosure.

Turning now to FIG. 4, a schematic block diagram 400 is depicted illustrating additional aspects or elements of self-conflict detector 216 that can rely on a second machine learning model in accordance with certain embodiments of this disclosure. In some embodiments, self-conflict detector 216 can leverage second ML model 408. As such, self-conflict detector 216 can consume as xApp control action data 402. xApp control action data 402 can comprise various data including all or a portion of xApp action data 404, xApp history data 406, and so forth.

xApp action data 404 can relate to given control action that is issued by xApp 106 during run time. For example, a control action that requests changes to configuration settings of RAN/E2 node 220. xApp history data 406 can relate to all previous actions (e.g., control actions) that were requested by xApp 106 during operation. Whether referring to a current action (e.g., xApp action data 404) or all previous actions (e.g., xApp history data 406), such information can be stored such as to data store 208 or elsewhere.

In response to xApp control action data 402 (e.g., xApp action data 404, xApp history data 406, . . . ) self-conflict detector 216 and/or second ML model 408 can generate second ML model output 410 which can indicate whether the current action conflicts with previous actions requested by xApp 106, which cause other types of vulnerabilities (e.g., performance inefficiencies or the like) in an associated network.

It is appreciated that xApp control action data 402 can generally be available during run time of xApp 106 (e.g., after xApp 106 has been registered and deployed near-RT RIC 202 and is actively executing to consume subscribed data and output control actions or other action requests. Thus, such information (e.g., xApp history data 406 or other xApp control action data 402) can be collected at run time and stored to data store 208 for subsequent use in connection with self-conflict manager 210.

Figure 5:
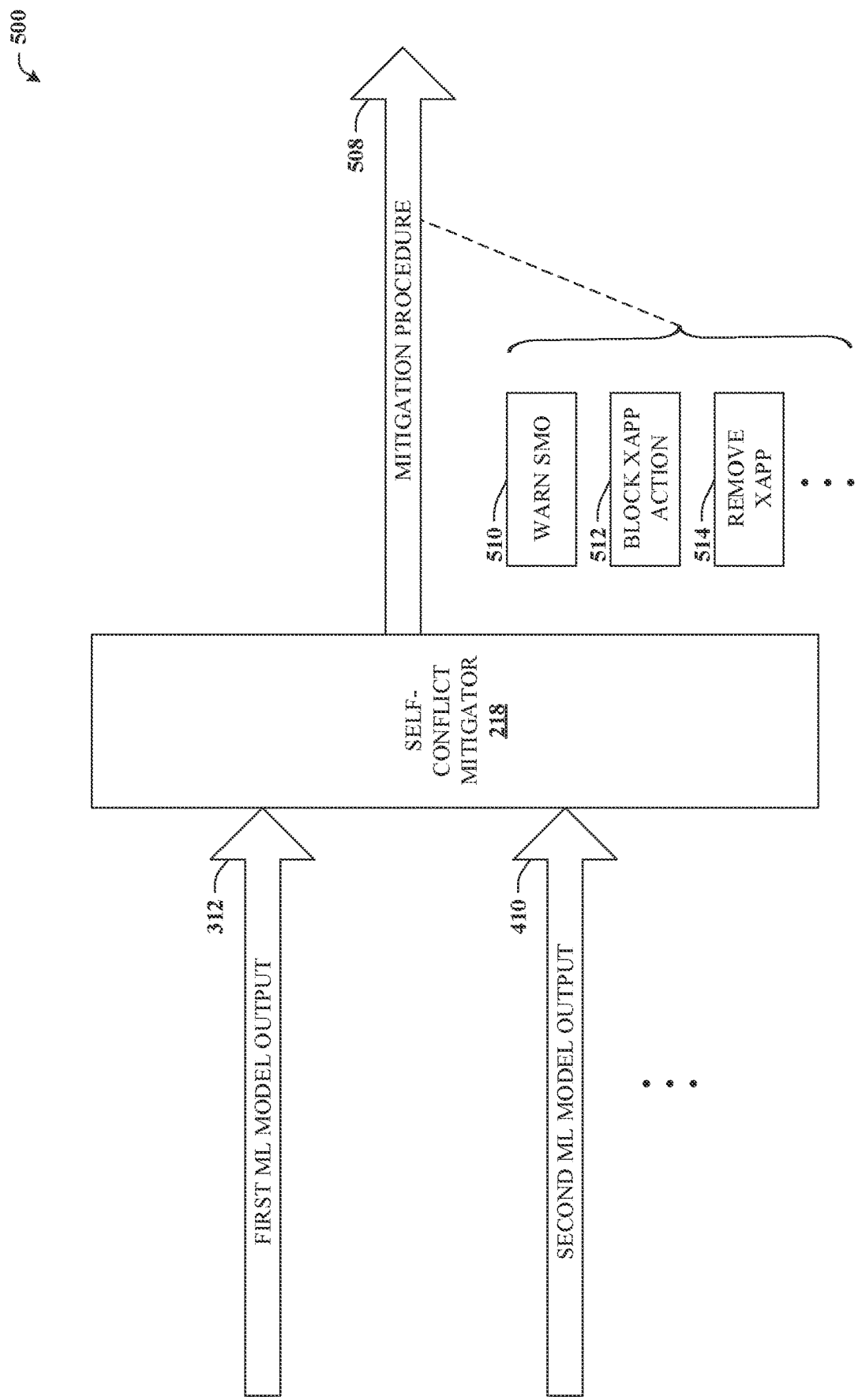
FIG. 5 depicts a schematic block diagram illustrating additional aspects or elements of the self-conflict mitigator in accordance with certain embodiments of this disclosure.

Referring now to FIG. 5, a schematic block diagram 500 is depicted illustrating additional aspects or elements of self-conflict mitigator 218 in accordance with certain embodiments of this disclosure. Self-conflict mitigator 218 can be configured to receive first ML model output 312 (which can be produced or determined at registration time of xApp 106) and/or second ML model output 410 (which can be produced or determined at run time of xApp 106), or any other suitable data (e.g., description data 308 or other xApp data 302, policy or business rules for an associated platform or environment, . . . ). Thus, self-conflict mitigator 218 can receive as input the output from one or both of vulnerability detector 214 or self-conflict detector 216

As previously noted, self-conflict mitigator 218 can employ a rules engine or rules-based approach and, based on the inputs, determine whether to employ mitigation procedure 508.

For example, if control actions for xApp 106 are not found to conflict with previous control actions (e.g., as determined from second ML model output 410) and/or if all input subscription to xApp 106 are relevant to the determined scope of xApp 106 and further all parameters controlled by xApp 106 are also relevant, then no conflict can be determined. As such, no mitigation procedure is applicable.

Otherwise, mitigation procedure 508 can be performed, which can vary depending on a type of vulnerability that is exposed, a severity of the vulnerability exposed, and so forth. For instance, examples of actions taken by mitigation procedure 508 can be to warn relevant devices or architecture as indicated at warning 510, block xApp control action, as indicated at blocking 512, remove xApp from a near-RT RIC 202 and potentially delete subscriptions to that xApp as indicated at removal 514, or another suitable mitigation technique.

For example, if a self-conflict occurs that is deemed to be suitable for warning 510, an alarm can be transmitting to SMO 102, which can indicate that a given sequence of control actions requested by xApp 106 are not directly correlated to that xApp's determined scope of operation or that another low priority vulnerability is detected such as improper subscriptions by xApp 106. It is understood that SMO 102 can take actions as well based on feedback (e.g., alarms detailed herein) from self-conflict manager 210, which can include rolling back a deployment of xApp 106 or another suitable action.

If a self-conflict occurs that is deemed to be suitable for blocking 512, an alarm can be transmitted to SMO 102 and, in addition, a current control action requested by xApp 106 can be rejected or blocked from being transmitted to RAN/E2 node 220. Thus, mitigation procedure 508 can therefore prevent xApp 106 from applying malicious or inefficient configuration settings. Such can be a one-time rejection of a control action request, but can reoccur should future control actions by xApp 106 be similarly determined to represent a threat or expose a potential vulnerability.

If a self-conflict occurs that is deemed to be suitable for removal 514 an alarm can be raised as before, which can take into account previously rejected actions of xApp 106 (e.g., a history of control actions rejected via blocking 512). In addition, all current or subsequent control actions can be blocked from transmission to RAN/E2 node 220. Moreover, all previous subscriptions of xApp 106 can be deleted and xApp 106 can be removed from near-RT RIC 202. Such can be performed for highly vulnerable subscriptions, over subscription of resources, particularly shared resources, or other severe vulnerabilities.

Figure 6:
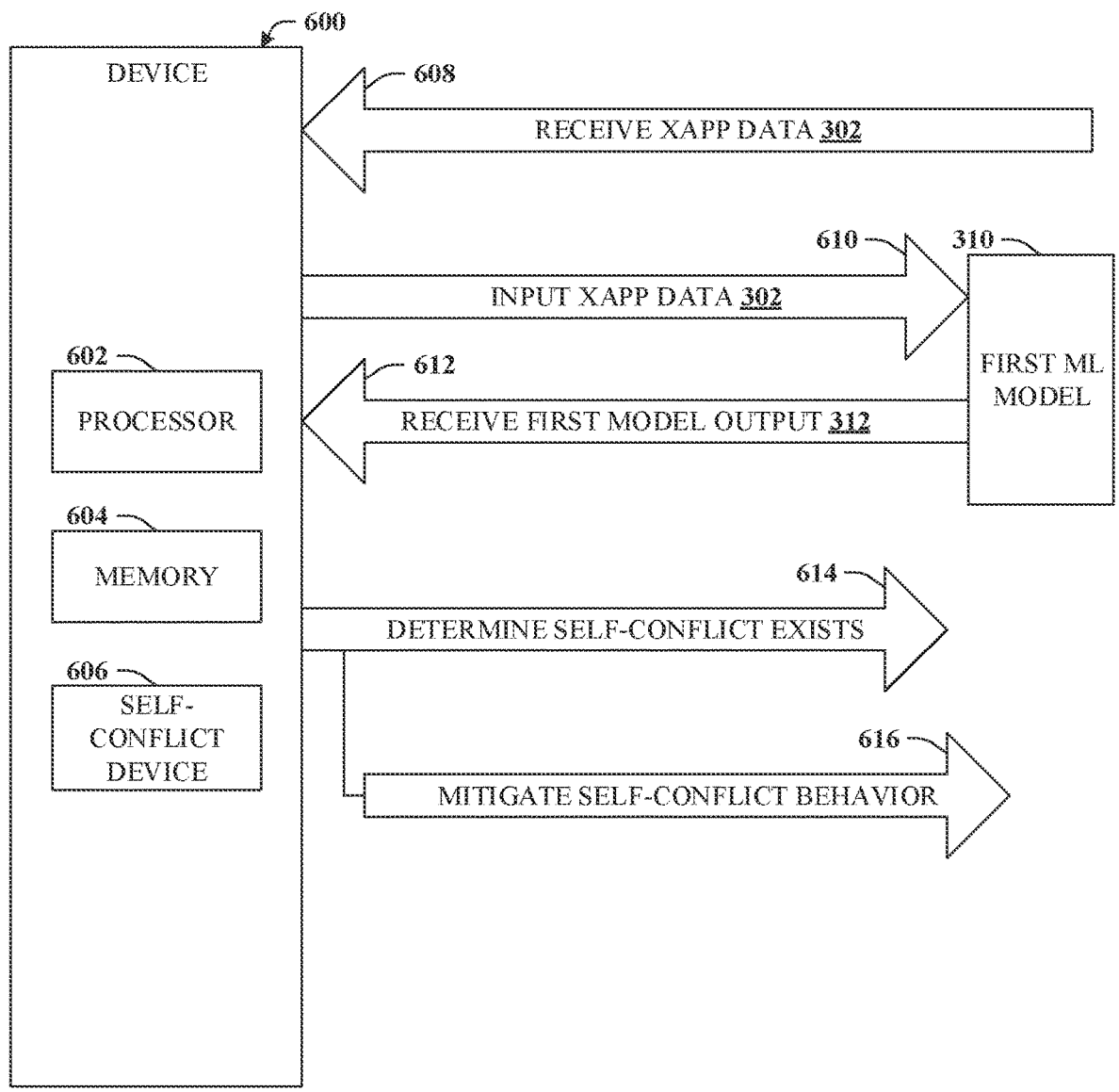
FIG. 6 depicts a schematic block diagram illustrating an example device that can use a first machine learning model to determine a potential self-conflict for an xApp in accordance with certain embodiments of this disclosure.

With reference now to FIG. 6, a schematic block diagram is depicted illustrating an example device 600 that can use a first machine learning model to determine a potential self-conflict for an xApp in accordance with certain embodiments of this disclosure. In some embodiments, device 600 can be, or can be included in, a near-RT RIC such as near-RT RIC 202. Device 600 can comprise self-conflict device 606, which can comprise all or a portion of vulnerability detector 214, self-conflict detector 216, self-conflict mitigator 218 and/or any suitable self-conflict manager 210 element.

Device 600 can comprise a processor 602 that, potentially along with self-conflict device 606, can be specifically configured to perform functions associated with self-conflict management. Device 600 can also comprise memory 604 that stores executable instructions that, when executed by processor 602, can facilitate performance of operations. Processor 602 can be a hardware processor having structural elements known to exist in connection with processing units or circuits, with various operations of processor 602 being represented by functional elements shown in the drawings herein that can require special-purpose instructions, for example, stored in memory 604 and/or self-conflict device 606. Along with these special-purpose instructions, processor 602 and/or self-conflict device 606 can be a special-purpose device. Further examples of the memory 604 and processor 602 can be found with reference to FIG. 14. It is to be appreciated that device 600 or computer 1402 can represent a server device or a client device of a network or network services platform and can be used in connection with implementing one or more of the systems, devices, or components shown and described in connection with FIG. 6 and other figures disclosed herein.

At reference numeral 608, device 600 can receive xApp data 302. As previously indicated, xApp data 302 can comprise input data 304 indicative of KPIs or other data subscribed to by a given xApp 106, parameter data 306 indicative of RAN or E2 node parameters that can be controlled by xApp 106. xApp data 302 can be received from a data store (e.g., data store 208) or be received during a registration/subscription process for xApp 106.

At reference numeral 610, device 600 can input all or a portion of xApp data 302 to first ML model 310. In response, at reference numeral 612, device 600 can receive first model output 312 from first ML model 310. First model output 312 can reflect a degree or potential of xApp 106 to expose a vulnerability based on inferences or patterns relating to xApp input data 302.

At reference numeral 614, device 600 can determine whether a self-conflict exists. In some embodiments, such can be based on a rules engine (e.g., self-conflict mitigator 218) that evaluates at least first model output 312. Existence of a self-conflict can mean, for example, that xApp 106 has subscribed to KPI's or requested to consume data that is determined to be inappropriate or outside the scope of xApp 106. A self-conflict might also mean in some embodiments that xApp 106 has oversubscribed to resources or has indicated a potential to control parameters of an E2 node that are inappropriate or outside the scope of xApp 106.

If device 600 determines a self-conflict does exist, then at reference numeral 616, device 600 can take steps to mitigate self-conflict behavior of xApp 106. For example, device 600 can perform or facilitate performance of mitigation procedure 508 detailed in connection with FIG. 5, which can include, for instance, warning 510, blocking 512, removal 514, and so forth.

Figure 7:
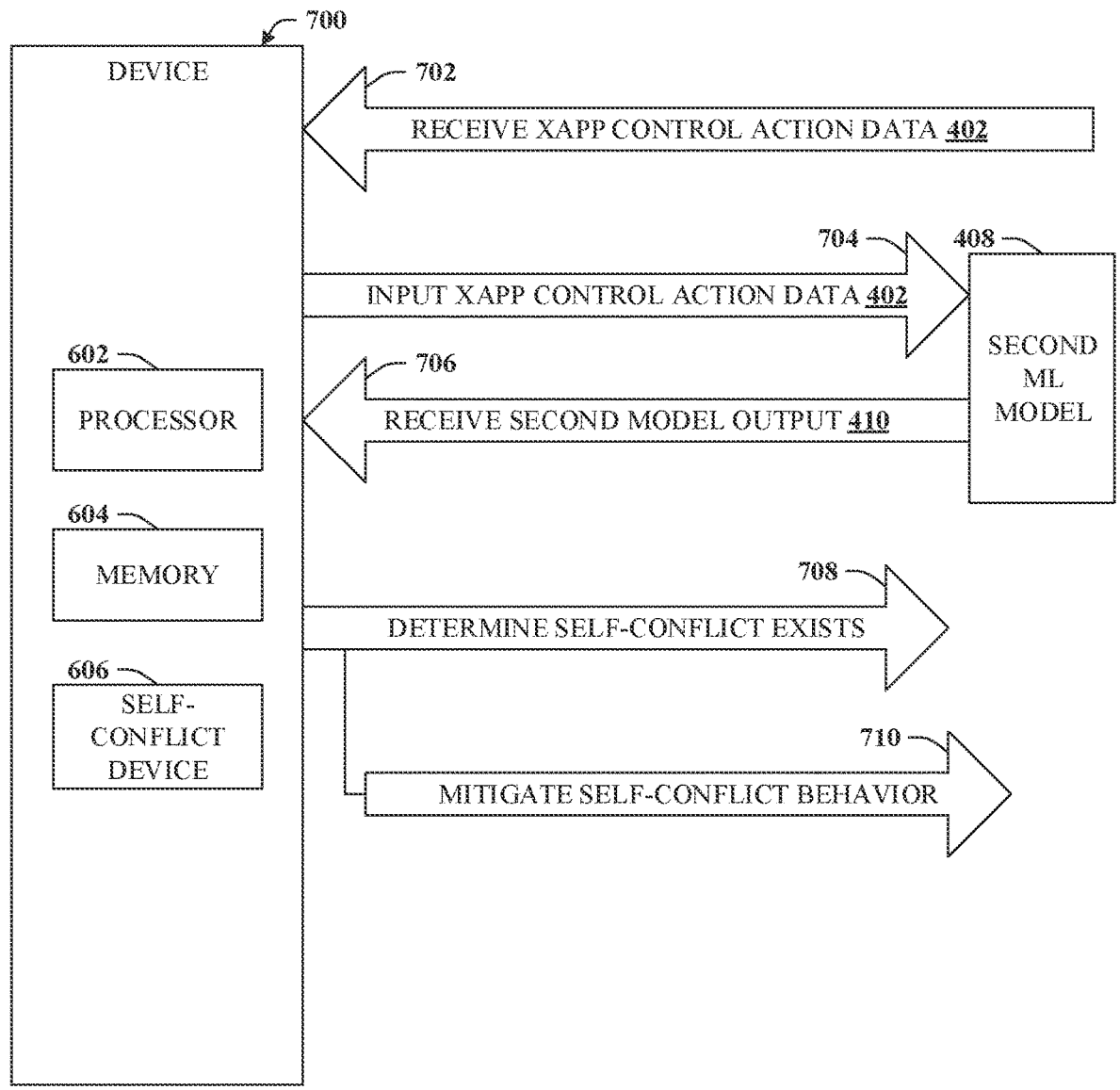
FIG. 7 depicts a schematic block diagram illustrating an example device that can use a second machine learning model to determine a potential self-conflict for an xApp in accordance with certain embodiments of this disclosure.

With reference now to FIG. 7, a schematic block diagram is depicted illustrating an example device 700 that can use a second machine learning model to determine a potential self-conflict for an xApp in accordance with certain embodiments of this disclosure. Device 700 can comprise a processor 602 and memory 604 as detailed in connection with FIG. 6. In some embodiments, device 700 can be, or can be included in, a near-RT RIC such as near-RT RIC 202. Device 700 can comprise conflict device 606, which can comprise all or a portion of vulnerability detector 214, self-conflict detector 216, self-conflict mitigator 218 and/or any suitable self-conflict manager 210 element. In some embodiments, device 700 can include all or a portion of device 600.

At reference numeral 702, device 700 can receive xApp control action data 402. As previously detailed, xApp control action data 402 can comprise xApp action data 404 such as a current control action or message issued by xApp 106 to control a parameter of a RAN/E2 node 220. xApp control action data 402 can also comprise xApp history data 406 that can be indicative of previous control actions requested by xApp 106.

At reference numeral 704, device 700 can input all or apportion of xApp control action data 402 to second ML model 408. In response, at reference numeral 706, device 700 can receive second model output 410. Second model output 410 can reflect a degree of potential of xApp 106 to expose a vulnerability based on inferences or patterns relating to xApp control action data 402.

At reference numeral 708, device 700 can determine whether a self-conflict exists. In some embodiments, such can be based on a rules engine (e.g., self-conflict mitigator 218) that evaluates at least second model output 410. Existence of a self-conflict can mean, for example, that xApp 106 has issued a control action that is determined to conflict with previous control actions requested by that xApp 106, one example of which is described in connection with FIG. 8.

If device 700 determines a self-conflict does exist, then at reference numeral 710, device 700 can take steps to mitigate self-conflict behavior of xApp 106. For example, device 800 can perform or facilitate performance of mitigation procedure 508 detailed in connection with FIG. 5, which can include, for instance, warning 510, blocking 512, removal 514, and so forth. It is further appreciated that in some embodiments, operation of device 600 utilizing first ML model 310 and operation of device 700 utilizing second ML model 408 can be combined into a single device.

Figure 8:
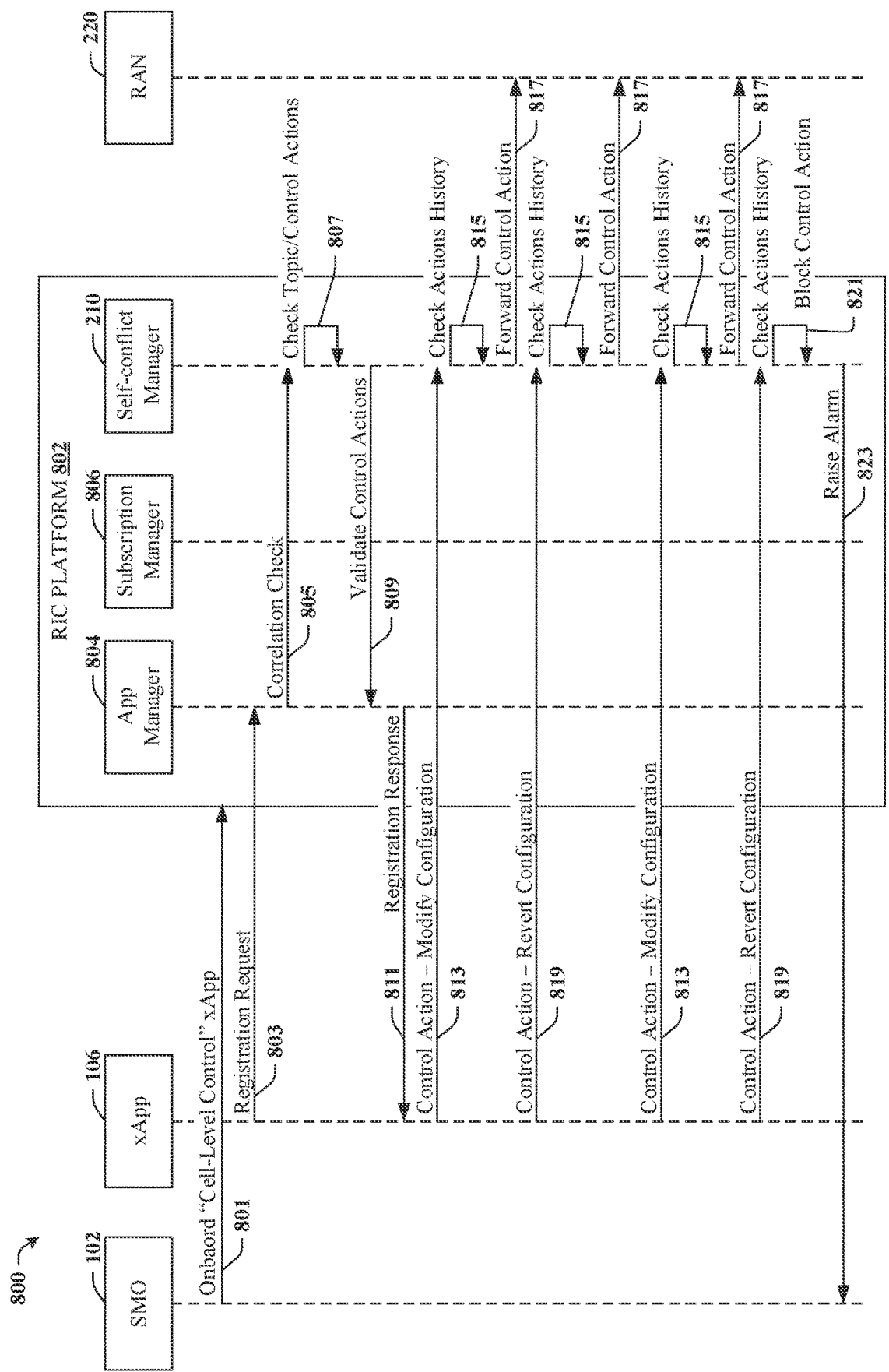
FIG. 8 depicts a call flow diagram illustrating mitigation of a first type of self-conflict relating to requesting control actions that conflict with previously requested control actions in accordance with certain embodiments of this disclosure.
Figure 9:
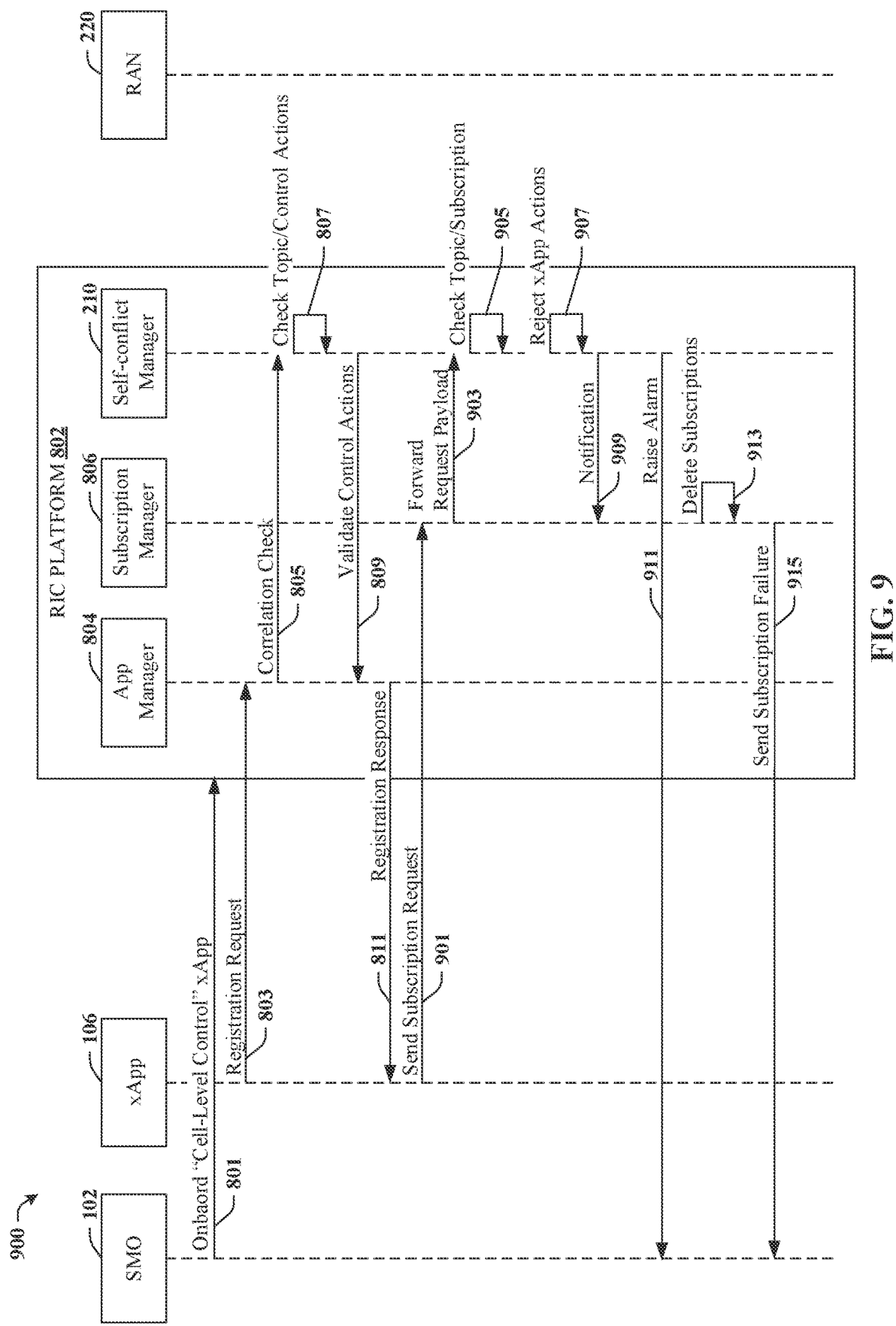
FIG. 9 depicts a call flow diagram illustrating mitigation of a second type of self-conflict relating to xApp subscription to improper resources in accordance with certain embodiments of this disclosure.
Figure 10:
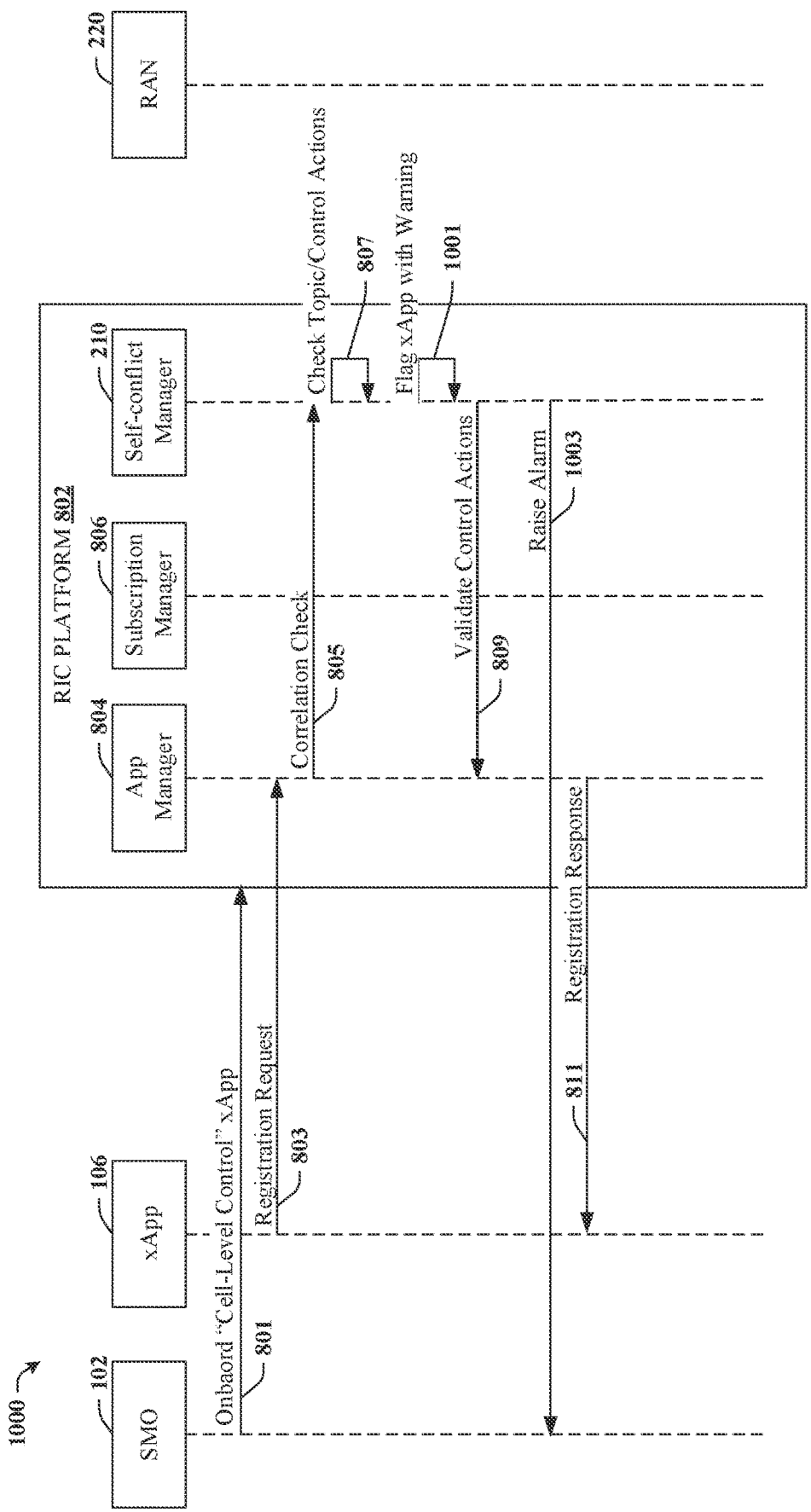
FIG. 10 depicts a call flow diagram illustrating mitigation of a third type of self-conflict relating to xApp control of improper parameters in accordance with certain embodiments of this disclosure.

FIGS. 8-10 relate to three distinct examples in which xApp 106 is determined to self-conflict and, as a result, expose an associated network to potential vulnerabilities.

Referring now to FIG. 8, a call flow diagram 800 is depicted illustrating mitigation of a first type of self-conflict relating to requesting control actions that conflict with previously requested control actions in accordance with certain embodiments of this disclosure.

Initially, at reference numeral 801, SMO 102 can transmit an onboarding request for a "cell-level control" xApp 106. Such can indicate that this particular xApp 106 is directed to the class or topic of cell-level control functions, which can be determined from description data 308 or in another suitable manner. Thus, at onboarding time, description data 308 (e.g., "cell-level control") can be stored to a data store (e.g., data store 208) of RIC Platform 802 (e.g., near-RT RIC 202).

At registration time of xApp 106, xApp 106 can transmit a registration request to app manager 804. App manager 804 can represent a platform function of RIC platform 802 and is generally responsible for handling registration and other management operations relating to xApps 106. Thus, App manager 804 can request a correlation check at reference numeral 805 with self-conflict manager 210, which can be exposed as a service. Self-conflict manager 210 (e.g., via self-conflict detector 216) can, at reference numeral 807, compare indicated control actions to the registered topic of xApp 106. In this example, xApp 106 control actions are confirmed to be appropriate for cell-level configuration modification, so this check is passed with no conflict flag raised and self-conflict manager 210 returns a validation at reference numeral 809 to app manager 804. In turn, app manager 804 transmits a registration response at reference numeral 811 that the registration was successful.

However, at runtime, when xApp 106 issues control action requests (e.g., reference numerals 813 and 819) it can be observed that xApp 106 is operating to modify a cell's configuration, and then reverting the cell's configuration back to the previous configuration. Initially, at reference numeral 815, the requested control actions can pass the check that compares control action history. As a result, the requested control actions can be forwarded to RAN 220. Eventually, due to these self-conflicting actions (e.g., constant flipping between one configuration and another), at reference numeral 821, self-conflict manager 210 can determine that the action history test is failed and reject the control action instead of forwarding the control action to RAN 220.

For instance, self-conflict manager 210 can at some point in the control action iteration flag xApp 106 for a self-conflict and reject the control action. When the flagged sequence appears again, self-conflict manager can reject all xApps subsequent control actions. At reference numeral 823, self-conflict manager 210 can transmit a warning or alarm flagging xApp 106 for self-conflicts. In such a manner, if a given xApp 106 that is indicated to optimize cell configurations of multiple neighboring cells sends too many control actions to modify cell-level configuration, redundant or repeating configuration changes, including control actions that frequently revert to a previous modification, then self-conflicting behavior can be identified and mitigated.

Turning now to FIG. 9, a call flow diagram 900 is depicted illustrating mitigation of a second type of self-conflict relating to xApp subscription to improper resources in accordance with certain embodiments of this disclosure.

As with the previous example of FIG. 8, xApp 106 is again directed to the topic of cell-level control and the onboarding, registration, and initial correlation check are performed as described in connection with FIG. 8 in accordance with call flow reference numerals 801-811.

In this example, additional detail is shown. For example, upon receipt of the registration response (e.g., reference numeral 811), at reference numeral 901, xApp 106 can transmit a subscription request to subscription manager 806, which can, as with app manager 804, be a standard platform function of RIC platform 802 that manages subscriptions associated with xApp 106. This subscription request can identify the KPI's or other data that xApp 106 intends to consume or represent runtime subscriptions to data.

At reference numeral 903, subscription manager 806 can forward the subscription request payload to self-conflict manager 210 (e.g., vulnerability detector 214). At reference numeral 905, self-conflict manager 210 compares the subscription request and determines that there is no correlation between at least one of the KPI's subscribed to by xApp 106 and the topic of cell-level control.

Hence, at reference numeral 907, self-conflict manager 210 can reject control actions of xApp 106. Furthermore, self-conflict manager 210, at reference numeral 909, can send a notification indicating the subscription vulnerability to subscription manager 806 and, at reference numeral 911, warn SMO 102. Meanwhile, at reference numeral 913, subscription manager 806 can delete existing subscriptions for xApp 106 and, at reference numeral 915 transmit a subscription failure response to SMO 102.

In this or a similar manner, if a given xApp 106, which is indicated to optimize cell configurations of multiple neighboring cells, over subscribes to information relating to a single user equipment (UE) while controlling several cell-level configuration an issue can be identified. For instance, the data on a single UE has no correlation with KPIs of multiple cells, so subscribing to such data can indicate a potential vulnerability.

With reference now to FIG. 10, a call flow diagram 1000 is depicted illustrating mitigation of a third type of self-conflict relating to xApp control of improper parameters in accordance with certain embodiments of this disclosure.

Similar to FIG. 8, at reference numeral 801, SMO 102 can transmit an onboarding request for a "cell-level control" xApp 106. Such can indicate that this particular xApp 106 is directed to the class or topic of cell-level control functions, which can be determined from description data 308 or in another suitable manner. Thus, at onboarding time, description data 308 (e.g., "cell-level control") can be stored to a data store (e.g., data store 208) of RIC Platform 802 (e.g., near-RT RIC 202).

At registration time of xApp 106, xApp 106 can transmit a registration request to app manager 804. App manager 804 can request a correlation check at reference numeral 805 with self-conflict manager 210. Self-conflict manager 210 (e.g., via self-conflict detector 216) can, at reference numeral 807, compare indicated control actions to the registered topic of xApp 106. In this example, xApp 106 control actions are determined to be inappropriate for cell-level configuration modification, so this check fails.

At reference numeral 1001, self-conflict manager 210 can flag xApp 106 actions with a warning, but otherwise validate control actions with app manager 804 as before at reference numeral 809. In addition, self-conflict manager 210 can raise an alarm with SMO 102 as previously detailed.

In this or a similar manner, if a given xApp 106 that is indicated to optimize cell configurations of multiple neighboring cells, but in operation only controls a single UE's parameters or flows (e.g., quality-of-service metrics), then a potential vulnerability can be identified. For instance, the control actions on a single UE may be determined to have little to no correlation to control actions related to cell-level configurations, which can be a potential vulnerability.

Example Methods

Figure 11:
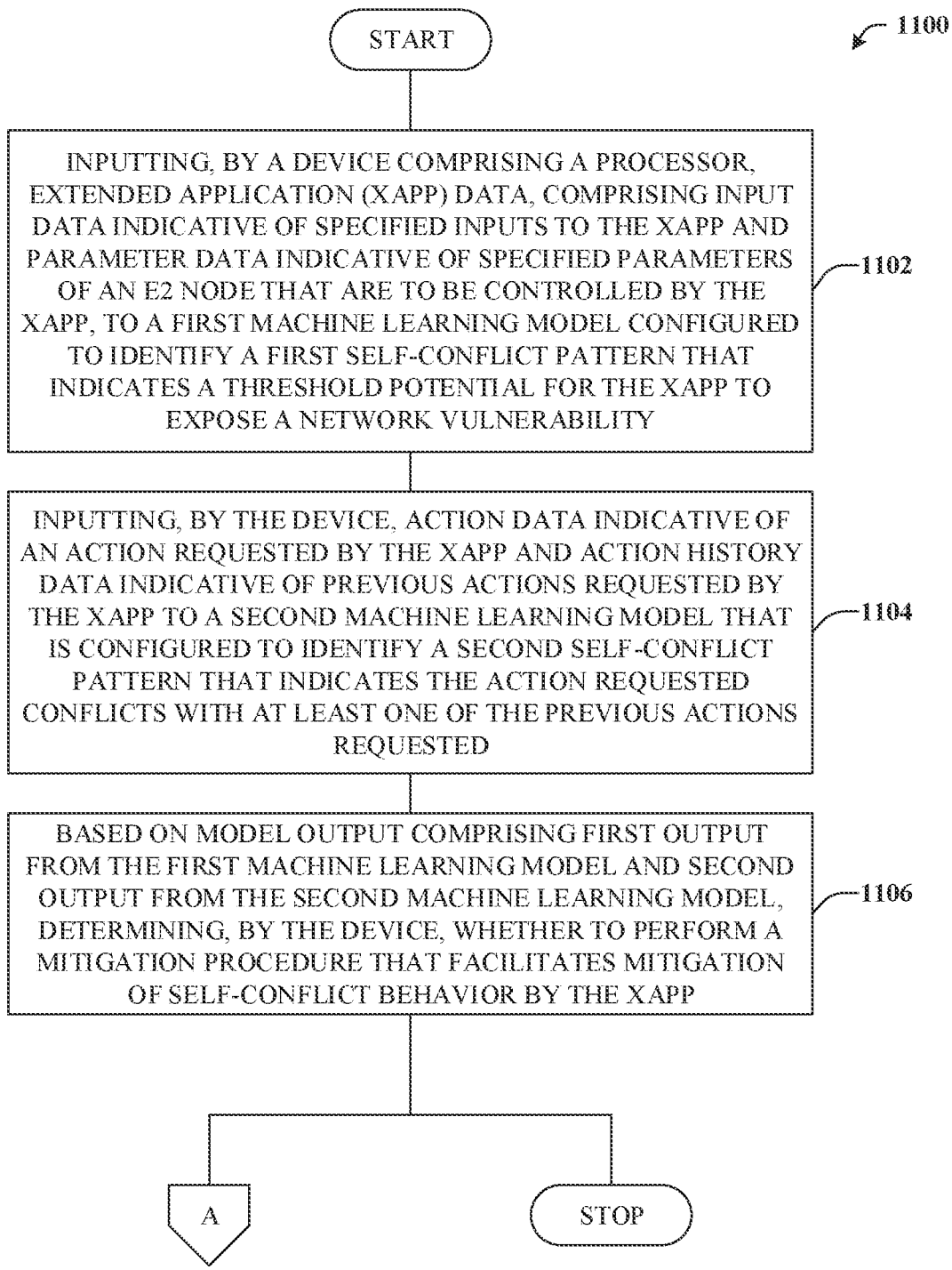
FIG. 11 illustrates an example method that can utilize machine learning techniques to mitigate xApp self-conflicts for an xApp executing on a near-RT RIC in accordance with certain embodiments of this disclosure.
Figure 12:
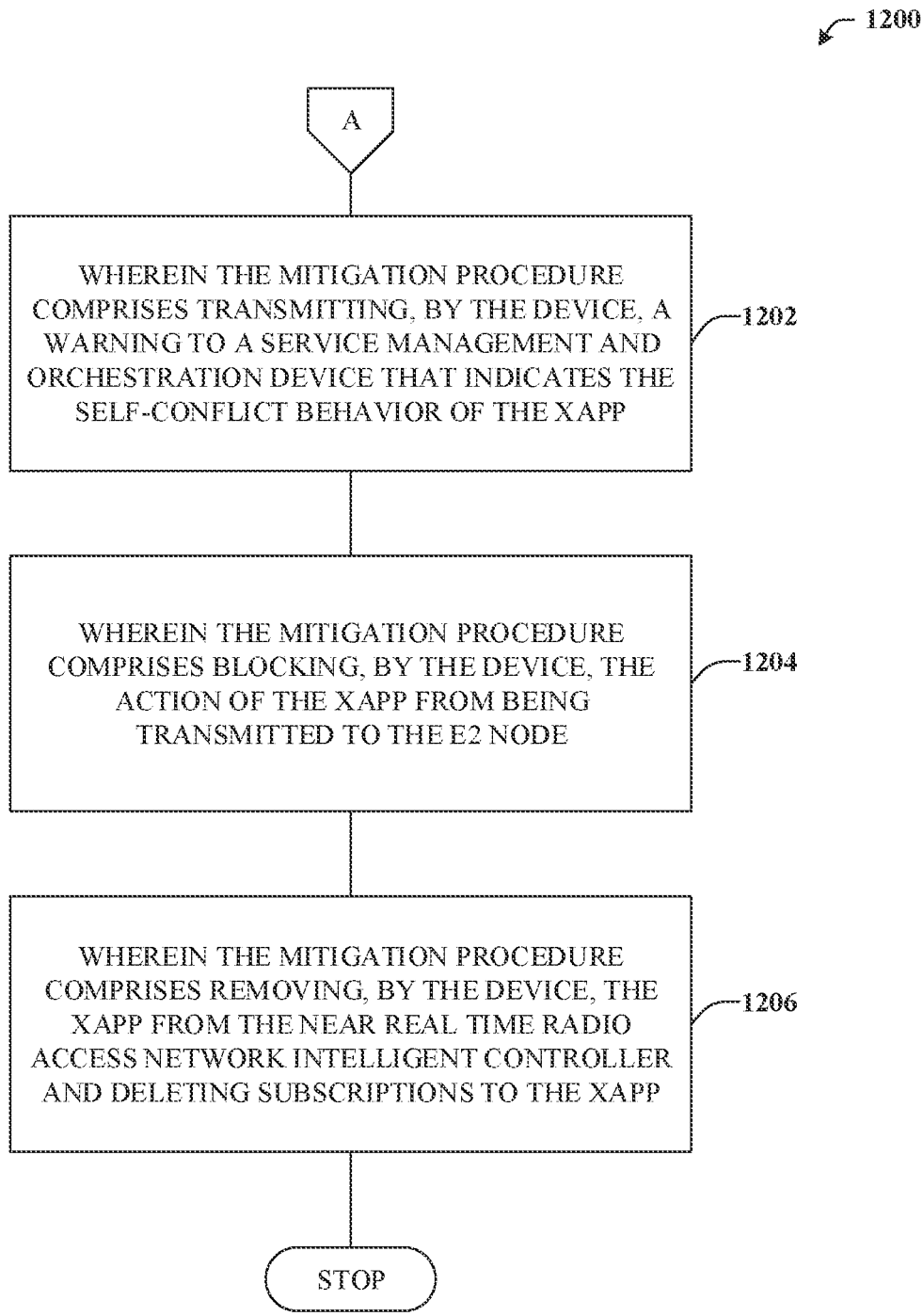
FIG. 12 illustrates an example method that can provide for additional aspect or elements in connection with utilizing machine learning techniques to mitigate xApp self-conflicts for an xApp executing on a near-RT RIC in accordance with certain embodiments of this disclosure.

FIGS. 11 and 12 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 11, exemplary method 1100 is depicted. Method 1100 can utilize machine learning techniques to mitigate xApp self-conflicts for an xApp executing on a near-RT RIC in accordance with certain embodiments of this disclosure. While method 1100 describes a complete method, in some embodiments, method 1100 can include one or more elements of method 1200, as illustrated by insert A.

At reference numeral 1102, a device comprising a processor can input extended application (xApp) data to a first machine learning model. The xApp data can comprise input data and parameter data. The input data can be indicative of specified inputs to the xApp. The parameter data can be indicative of specified parameters of an E2 node that are to be controlled by the xApp. The first machine learning model can be configured to identify a first self-conflict pattern that indicates a threshold potential for the xApp to expose a network vulnerability.

At reference numeral 1104, the device can input xApp control action data to a second machine learning model. The xApp control action data can comprise action data and action history data. The action data can be indicative of an action requested by the xApp. The action history data can be indicative of previous actions requested by the xApp. The second machine learning model can be configured to identify a second self-conflict pattern that indicates the action requested conflicts with at least one of the previous actions requested.

At reference numeral 1106, the device can determine whether to perform a mitigation procedure that facilitates mitigation of self-conflict behavior by the xApp. The determination of whether to perform the mitigation procedure can be based on model output comprising first output from the first machine learning model and second output from the second machine learning model. Method 1100 can terminate in some embodiments, or proceed to insert A, which is further detailed in connection with FIG. 12.

Turning now to FIG. 12, exemplary method 1200 is depicted. Method 1200 can provide for additional aspect or elements in connection with utilizing machine learning techniques to mitigate xApp self-conflicts for an xApp executing on a near-RT RIC in accordance with certain embodiments of this disclosure. For example, method 1200 can relate to aspects of the mitigation procedure indicated at reference numeral 1106 of FIG. 11.

For example, at reference numeral 1202, the device introduced at reference numeral 1102 comprising a processor can, as one part of the mitigation procedure, transmit a warning to a service management and orchestration device that indicates the self-conflict behavior of the xApp.

At reference numeral 1204, the device can, as a part of the mitigation procedure, block the action of the xApp from being transmitted to the E2 node.

At reference numeral 1206, the device can, as a part of the mitigation procedure remove the xApp from the near real time radio access network intelligent controller and/or delete subscriptions to the xApp.

Example Operating Environments

Figure 13:
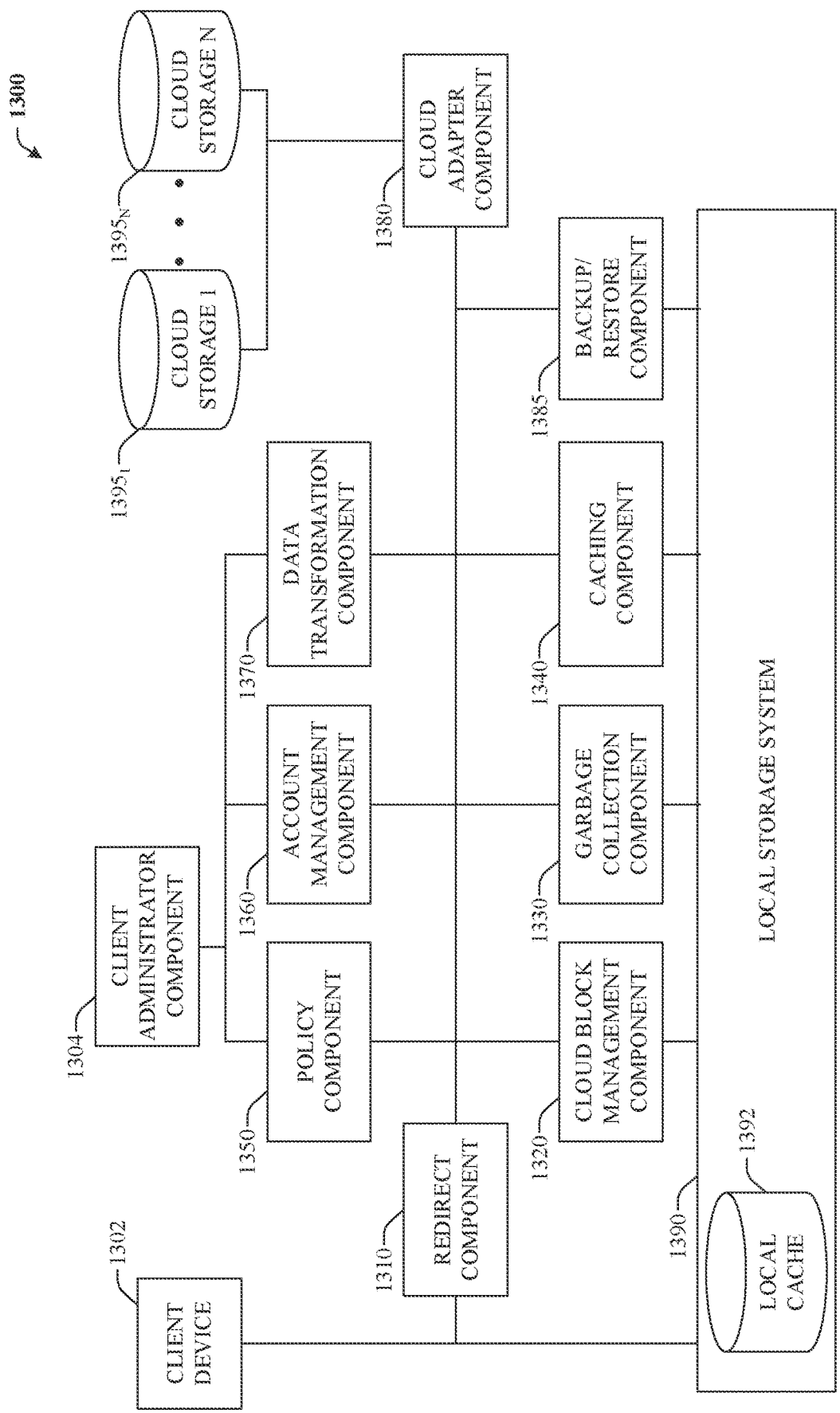
FIG. 13 illustrates a block diagram of an example distributed file storage system that employs tiered cloud storage in accordance with certain embodiments of this disclosure.
Figure 14:
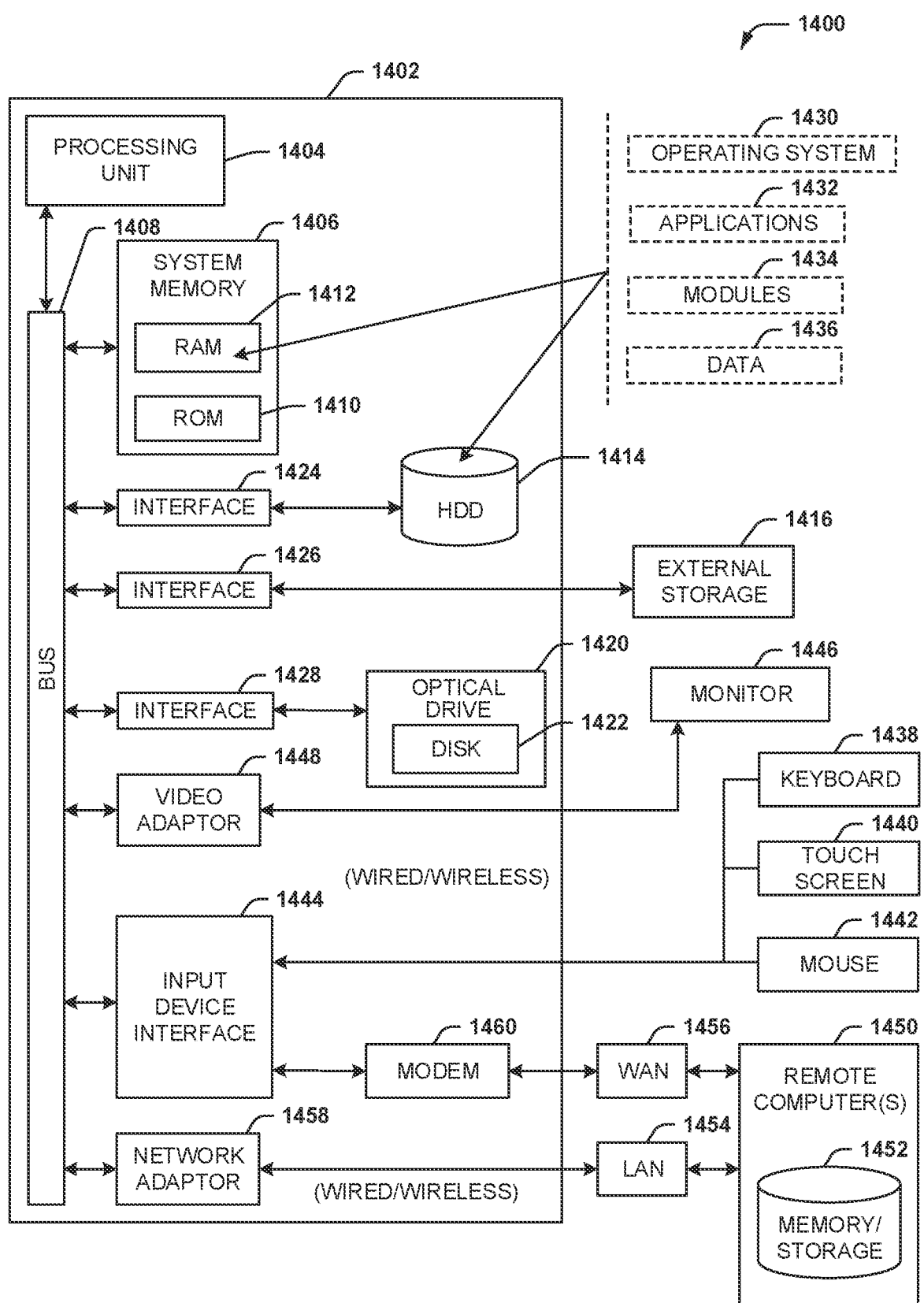
FIG. 14 illustrates an example block diagram of a computer operable to execute certain embodiments of this disclosure.

To provide further context for various aspects of the subject specification, FIGS. 13 and 14 illustrate, respectively, a block diagram of an example distributed file storage system 1300 that employs tiered cloud storage and block diagram of a computer 1402 operable to execute the disclosed storage architecture in accordance with aspects described herein.

Referring now to FIG. 13, there is illustrated an example local storage system including cloud tiering components and a cloud storage location in accordance with implementations of this disclosure. Client device 1302 can access local storage system 1390. Local storage system 1390 can be a node and cluster storage system such as an EMC Isilon Cluster that operates under OneFS operating system. Local storage system 1390 can also store the local cache 1392 for access by other components. It can be appreciated that the systems and methods described herein can run in tandem with other local storage systems as well.

As more fully described below with respect to redirect component 1310, redirect component 1310 can intercept operations directed to stub files. Cloud block management component 1320, garbage collection component 1330, and caching component 1340 may also be in communication with local storage system 1390 directly as depicted in FIG. 13 or through redirect component 1310. A client administrator component 1304 may use an interface to access the policy component 1350 and the account management component 1360 for operations as more fully described below with respect to these components. Data transformation component 1370 can operate to provide encryption and compression to files tiered to cloud storage. Cloud adapter component 1380 can be in communication with cloud storage 1 1395$_1$ and cloud storage N 1395$_N$, where N is a positive integer. It can be appreciated that multiple cloud storage locations can be used for storage including multiple accounts within a single cloud storage location as more fully described in implementations of this disclosure. Further, a backup/restore component 1385 can be utilized to back up the files stored within the local storage system 1390.

Cloud block management component 1320 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1320 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1360 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1320 based on list of mappings it manages. For example, each stub can be associated with an account, and the cloud block management component 1320 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1380 manages the sending and receiving of data to and from the cloud service providers. The cloud adapter component 1380 can utilize a set of APIs. For example, each cloud service provider may have provider specific API to interact with the provider.

A policy component 1350 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1330. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1330 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1340 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1320, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1340 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1340 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1370 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1385 can transfer a copy of the files within the local storage system 1390 to another cluster (e.g., target cluster). Further, the backup/restore component 1385 can manage synchronization between the local storage system 1390 and the other cluster, such that, the other cluster is timely updated with new and/or modified content within the local storage system 1390.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1494 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
determining that an extended application (xApp) has been registered to a near real time radio access network intelligent controller, resulting in xApp data comprising input data indicative of specified inputs to the xApp and parameter data indicative of specified parameters of a radio access network (RAN) node that are to be controlled by the xApp;
inputting the xApp data associated with the xApp to a first machine learning model that is configured to identify a first self-conflict pattern that results from the xApp requesting a change to at least one of the specified parameters that is determined to be redundant or in conflict with a previous change to the specified parameters that were requested by the xApp itself, wherein the change to the at least one of the specified parameters is determined by the first machine learning model to exceed a threshold likelihood for the xApp to expose a network vulnerability; and
based on model output comprising first output from the first machine learning model, determining whether to initiate mitigation of self-conflict behavior by the xApp.

2. The device of claim 1, wherein the operations further comprise, inputting action data indicative of an action requested by the xApp and action history data indicative of previous actions requested by the xApp to a second machine learning model that is configured to identify a second self-conflict pattern that indicates that the action requested by the xApp conflicts with at least one of the previous actions requested by the xApp.

3. The device of claim 2, wherein the model output further comprises second output from the second machine learning model.

4. The device of claim 1, wherein the xApp data further comprises description data comprising an indication of an objective of the xApp.

5. The device of claim 1, wherein the first self-conflict pattern relates to an indication that the xApp has subscribed to a resource that is not relevant to operation of the xApp.

6. The device of claim 1, wherein the RAN node is an E2 node, and wherein the first self-conflict pattern relates to an indication that the xApp has registered to control a parameter of the E2 node that is not relevant to operation of the xApp.

7. The device of claim 1, wherein the mitigation comprises transmitting a warning to a service management and orchestration device that indicates the self-conflict behavior of the xApp.

8. The device of claim 1, wherein the mitigation comprises blocking a control action of the xApp from being transmitted to the RAN node.

9. The device of claim 1, wherein the mitigation comprises removing the xApp from the near real time radio access network intelligent controller and deleting subscriptions to the xApp.

10. A device, comprising:
a processor; and
a memory that stores executable instructions that, when executed by the processor, facilitate performance of operations, comprising:
in response to an extended application (xApp) performing a control action request to control a parameter of a radio access network (RAN) node, retrieving history data indicative of previous control actions of the xApp;
inputting the history data and the control action request to a first machine learning model that is configured to identify a first self-conflict pattern that indicates the control action request conflicts with at least one of the previous control actions that was requested by the xApp; and
based on model output comprising first output from the first machine learning model, determining whether to perform a mitigation procedure that mitigates self-conflict behavior by the xApp.

11. The device of claim 10, wherein the RAN node is an E2 node, and wherein the operations further comprise, inputting xApp data, comprising input data indicative of specified inputs to the xApp and parameter data indicative of specified parameters of the E2 node that are to be controlled by the xApp, to a second machine learning model that is configured to identify a second self-conflict pattern that indicates a potential for the xApp to expose a network vulnerability.

12. The device of claim 11, wherein the model output further comprises second output from the second machine learning model.

13. The device of claim 10, wherein the model output further comprises second output from the second machine learning model.

14. The device of claim 10, wherein the first self-conflict pattern relates to a reversion to a previous configuration.

15. The device of claim 10, wherein the mitigation procedure comprises blocking a control action of the xApp from being transmitted to the RAN node.

16. The device of claim 10, wherein the mitigation procedure comprises removing the xApp from the near real time radio access network intelligent controller and deleting subscriptions to the xApp.

17. A method, comprising:
inputting, by a device comprising a processor, extended application (xApp) data, comprising input data indicative of specified inputs to the xApp and parameter data indicative of specified parameters of an E2 node that are to be controlled by the xApp, to a first machine learning model configured to identify a first self-conflict pattern that indicates a threshold potential for the xApp to expose a network vulnerability;
inputting, by the device, action data indicative of an action requested by the xApp and action history data indicative of previous actions requested by the xApp to a second machine learning model that is configured to identify a second self-conflict pattern that indicates the action requested conflicts with at least one of the previous actions requested by the xApp itself; and
based on model output comprising first output from the first machine learning model and second output from the second machine learning model, determining, by the device, whether to perform a mitigation procedure that facilitates mitigation of self-conflict behavior by the xApp.

18. The method of claim 17, wherein the mitigation procedure comprises transmitting, by the device, a warning to a service management and orchestration device that indicates the self-conflict behavior of the xApp.

19. The method of claim 18, wherein the mitigation procedure comprises blocking, by the device, the action of the xApp from being transmitted to the E2 node.

20. The method of claim 18, wherein the mitigation procedure comprises removing, by the device, the xApp from the near real time radio access network intelligent controller and deleting subscriptions to the xApp.

\* \* \* \* \*